United States Patent [19]

Ishii et al.

[11] 4,035,338

[45] July 12, 1977

[54] METHOD OF STABILIZING OXYMETHYLENE COPOLYMERS

[75] Inventors: Takami Ishii, Chiba; Taro Suzuki, Ube; Naohisa Takikawa, Ube; Kiyoaki Tokunaga, Ube; Choji Arima, Ube; Hiroshi Kojima, Ube, all of Japan

[73] Assignee: UBE Industries, Ltd., Japan

[21] Appl. No.: 587,728

[22] Filed: June 17, 1975

[30] Foreign Application Priority Data

June 21, 1974   Japan ............................... 49-70156

[51] Int. Cl.$^2$ ........................................... C08G 2/36
[52] U.S. Cl. ..................... 260/67 FP; 260/45.8 A; 260/45.8 N
[58] Field of Search ................. 260/45.8 A, 45.8 N, 260/67 FP

[56] References Cited

U.S. PATENT DOCUMENTS

| 3,718,630 | 2/1973 | Leverett | 260/67 FP |
| 3,756,985 | 9/1973 | Gerlach et al. | 260/67 FP |
| 3,875,117 | 4/1975 | Ackermann et al. | 260/67 FP |
| 3,880,804 | 4/1975 | Ishii et al. | 260/45.85 N |

*Primary Examiner*—Lucille M. Phynes
*Attorney, Agent, or Firm*—Sherman & Shalloway

[57] ABSTRACT

A method of stabilizing oxymethylene copolymers which comprises heating an oxymethylene copolymer in a hydrocarbonaceous mixed medium consisting of about 50 – 92% by weight of a hydrocarbon having 5 – 7 carbon atoms, about 6 – 48% by weight of an alcohol and about 2 – 20% by weight of water based on the total amount of the medium, at a temperature of from about 100° to about 170° C. in the presence of a salt selected from the group consisting of the sodium and potassium salts of ethylenediaminetetraacetic acid under the conditions of a pH value of from about 4 to about 7.

16 Claims, No Drawings

METHOD OF STABILIZING OXYMETHYLENE COPOLYMERS

This invention relates to an improvement in the method of stabilizing oxymethylene copolymers, by which method superior thermal stability and base stability can be conferred on the oxymethylene copolymers with a reduced amount of medium and a reduced amount of the heat recovery of the medium and without entailment of such drawbacks as objectionable discoloration or substantial reduction of the intrinsic viscosity of the copolymers. More particular, the invention relates to an improvement in the method of stabilizing the oxymethylene copolymers which comprises heating the oxymethylene copolymers in a hydrocarbonaceous mixed medium consisting of about 50 – 92% by weight of a hydrocarbon having 5 to 7 carbon atoms, about 6 – 48% by weight of an alcohol and about 2 –20% by weight of water based on the total amount of the medium, at a temperature of from about 100° to about 170° C. in the presence of a salt selected from the group consisting of the sodium and potassium salts of ethylenediaminetetraacetic acid (EDTA) under the conditions of a pH value of from about 4 to about 7.

Methods of preparing the oxymethylene copolymers are well known. For example, they can be prepared by a method comprising copolymerizing trioxane and a cyclic ether in the presence of a Lewis acid (U.S. Pat. No. 3,027,352); a method comprising reacting an oxymethylene homopolymer and 1,3-dioxolane in the presence of a Lewis acid (British Pat. No. 1,103,730); a method comprising copolymerizing formaldehyde and a cyclic ether in the presence of a reaction product mixture of a metal chelate compound and a Lewis acid (U.S. Pat. No. 3,803,049); or a method comprising reacting an oxymethylene homopolymer and 1,3,6-trioxocane (Japanese Patent Publication No. 3711/73).

Since the oxymethylene copolymer prepared in such a manner as mentioned above has at its ends an unstable portion consisting of the oxymethylene units and moreover contains the oxymethylene homopolymer, its thermal stability and stability in basic media are poor. It was thus known to possess shortcomings making it not fit for practical use.

Various suggestions have been made with a view to stabilizing the oxymethylene copolymers having such unstable terminal groups. For example, in Belgian Patent 602,869, there is suggested a method of stabilizing the oxymethylene copolymers by submitting them to either alkaline hydrolysis or alcoholysis in an aqueous medium, e.g., water, alcohol or a mixture thereof in the presence of an alkaline substance such as alkali metal hydroxides, alkaline earth metal hydroxides, ammonia and amines. According to this suggestion, acidic hydrolysis is held to be nonselective and hence should be avoided. Again, neutral hydrolysis is also held to be undesirable. In Japanese Patent Publication No. 10951/1970, there is suggested in contradistinction to the above a stabilization method in which the oxymethylene copolymers are heat-treated in an aqueous medium of a pH not more than 7 containing, for example, an inorganic neutral salt, such as, an alkali metal sulfate or an alkali metal halide in an amount of 0.1 – 30 wt. % of said polymer. There is disclosed in this proposal that it was found that the foregoing inorganic neutral salts de-activated the catalyst used in the preparation of the oxymethylene copolymers such, for example, as boron trifluoride etherate, with the consequence that the thermal stability of the oxymethylene copolymers was improved. And in this latter proposal there is shown by way of comparison an experiment carried out by using as an alkaline substance triethanolamine in accordance with the suggestion of the former Belgian patent, thus showing that experimentally comparable results are obtained as in the former suggestion by the use of inorganic neutral salts and that the latter was rather to be preferred when the matter of discoloration of the copolymer was considered. On the basis of this experiment, the proponent of the latter proposal concludes that the inorganic neutral salts possess an equal degree of stabilization effects as in the case of the alkaline substances of the former proposal, and that hence the presence of the alkaline substances as in the former proposal is essentially of no significance at all.

While the possibility of an objectionable reduction of the molecular weight of the oxymethylene copolymer is small in the case of the alkaline hydrolysis of the former proposal using an alkaline substance, the disadvantage of the copolymer becoming discolored cannot be avoided. On the other hand, in the case of acidic hydrolysis, as indicated in the aforementioned Belgian patent, difficulty is experienced in selectively removing the unstable portions at the ends of the oxymethylene copolymer without the accompaniment of an objectionable reduction of the molecular weight of the copolymer.

With a view to solving such a contradictory problem as above described there has been suggested a method of stabilizing the oxymethylene copolymers which comprises heating the oxymethylene copolymers at a temperature of from about 100° to about 170° C. in an aqueous medium in the presence of either a sodium or potassium salt of ethylenediaminetetraacetic acid under the conditions of a pH value of from about 4 to about 7. (U.S. Pat. No. 3,880,804. In this proposal an aqueous medium consisting of water or a mixture of water and an alcohol is used. In practicing this proposal on a commercial scale, the amount of the aqueous medium to be treated after the stabilization treatment is very considerable, and especially in the case where a mixture of water and an alcohol is used, there is the disadvantage that the amount of heat required in recovering said alcohol is also very considerable.

In consequence of our researches with a view to providing a still more improved method of stabilizing oxymethylene copolymers avoiding such disadvantages, we found that the above-mentioned contradictory problem and disadvantages could be solved by using instead of the aqueous medium consisting of water or a mixture of water and an alcohol of the aforementioned proposal, a hydrocarbonaceous mixed medium consisting essentially of about 50 – 92% by weight of a hydrocarbon having 5 to 7 carbon atoms, about 6 – 48% by weight of an alcohol and about 2 – 20% by weight of water based on the total amount of the medium. We also found that it was possible by the use of the foregoing hydrocarbonaceous mixed medium to provide stabilized oxymethylene copolymers having still more improved thermal stability and base stability with a higher degree of quality reproducibility, this being achieved without the entailment of an objectionable discoloration of the copolymer or a substantial reduction of its intrinsic viscosity.

In the invention method, the stabilization of the oxymethylene copolymer is carried out in a hydrocarbonaceous mixed medium as noted previously. As the hydrocarbons having 5 to 7 carbon atoms which account for a major part of the foregoing medium used in the invention method, are included aliphatic or alicyclic hydrocarbons of 5- 7 carbon atoms, aromatic hydrocarbons of 6 - 7 carbon atoms, and mixtures of these hydrocarbons. Specific examples of these hydrocarbons are n-pentane, n-hexane, n-heptane, cyclopentane, cyclohexane, benzene and toluene.

As the alcohols which account for a minor part of the foregoing hydrocarbonaceous mixed medium, alcohols having 1 – 3 carbon atoms are preferably used. As examples of these preferred alcohols, mention can be made of the aliphatic monohydric alcohols such as methanol, ethanol, n-propyl alcohol, isopropyl alcohol and mixtures thereof. The hydrocarbonaceous mixed medium consisting of a major amount of the hydrocarbon and a minor amount of the aforesaid alcohol as well as water is preferably used in an amount of from about 400 to about 2000 parts by weight per 100 parts by weight of the oxymethylene copolymer to be submitted to the stabilization treatment.

When the amount of the mixed solvent is smaller than the above range, the oxymethylene copolymer is not sufficiently stabilized. Even when the amount of the mixed solvent is larger than the above range, the heat stability of the resulting stabilized oxymethylene copolymer is not improved, and it only results in an increase in the amount of heat required to recover the solvent after stabilization.

The oxymethylene copolymer to be stabilized by the invention method which can be obtained by such known methods as described above, possesses at its ends an unstable portion consisting of oxymethylene units or is that containing an oxymethylene homopolymer. The base stability of such an oxymethylene copolymer is not greater than 98% and its $A_{222}$ is at least 0.10% per minute. Usually, an oxymethylene copolymer having an $[\eta]$ (the intrinsic viscosity as measured at 60° C. on a solution of the copolymer in p-chlorophenol containing 2 wt. % of alphapinene) of from about 1.0 to about 2.5 is used.

The oxymethylene copolymer used in the invention method is prepared, as hereinbefore described, using a Lewis acid as the copolymerization catalyst, and the resulting oxymethylene copolymer slurry contains the Lewis acid. In the present invention a basic compound such as ammonia, a tertiary amine, sodium hydroxide, sodium carbonate and a tetrasodium salt of ethylenediaminetetraacetic acid is added to the foregoing oxymethylene copolymer slurry to neutralize the Lewis acid contained in the slurry. The resulting slurry can then be submitted, as obtained, to the stabilization treatment. Thus, no special treatment is required for removing the Lewis acid from the slurry. The amount added of the foresaid basic compound is suitably 1 – 5 times the molar quantity of the Lewis acid contained in the slurry. Again, the oxymethylene copolymer submitted to the stabilization treatment in this invention may be that obtained by separating the copolymer from the oxymethylene copolymer slurry obtained in the copolymerization reaction by filtration and then washing and drying the copolymer.

According to the invention method, the stabilization reaction is carried out in a hydrocarbonaceous mixed medium consisting of about 50 – 92% by weight of a hydrocarbon such as hereinbefore indicated, about 6 – 48% by weight of an alcohol such as hereinbefore indicated and about 2 – 20% by weight of water. When the amount of the hydrocarbon accounting for a major portion of the medium is less than about 50% by weight and the amount of the alcohol is correspondingly greater, the amount of heat required in recovering the alcohol becomes greater because heat of vaporization of the alcohol is greater than that of the hydrocarbon, with the consequence that there is a disadvantage in practicing the method on a commercial scale. Furthermore, the intended further improvement of the method as hereinbefore described becomes difficult of attainment. On the other hand, when the amount of the alcohol becomes less than about 6% by weight, the resulting oxymethylene copolymer becomes blocky or lumpy in form creating difficulty in carrying out its washing efficiently. In addition, it becomes difficult to achieve a further improvement in the thermal stability of the copolymer. Further, when the amount of water is less than 2% by weight, an oxymethylene copolymer excelling in thermal stability cannot be obtained, whereas when the amount of water exceeds 20% by weight, the copolymer obtained is blocky or lumpy, and hence the washing of the oxymethylene copolymer after its stabilization cannot be carried out efficiently. The thermal stability of the resulting oxymethylene copolymer is also not satisfactory.

In the invention method the stabilization reaction is carried out in the presence of a sodium and/or potassium salt of EDTA under pH conditions of from about 4 to about 7. The objects of the present invention cannot be achieved under alkaline conditions in which only the sodium and/or potassium salt of EDTA has been used or under alkaline conditions in which in addition to the presence of these salts other alkaline substances are present. Further, the objects of the invention cannot be achieved under conditions of a pH value of from about 4 to about 7 in which the sodium and/or potassium salt of EDTA has been omitted. Again, the improvement intended by the present invention cannot be achieved in such cases where the composition of the hydrocarbonaceous mixed medium deviates from the hereinbefore-indicated ranges, i.e., when the amount of water is either too great or too small or when the amount of the alcohol is insufficient.

As examples of the foregoing salts of EDTA, there can be named the tetrasodium and disodium salts of EDTA and the tetrapotassium and dipotassium salts of EDTA. While the amount in which these salts of EDTA are used can be suitably varied in accordance with the class of the oxymethylene copolymer, the pH adjustment conditions, the temperature of the stabilization reaction, and the composition and amount of the hydrocarbonaceous mixed medium, they are usually used in an amount of at least about 0.1 part by weight per 100 parts by weight of the oxymethylene copolymer. As there is no further enhancement of the stabilization effects by the use of these salts in a large amount, usually their use in an amount of the order of from about 0.1 to about 3 parts by weight per 100 parts by weight of the oxymethylene copolymer will suffice. If desired, a larger amount may also be used.

According to the invention method, the stabilization reaction is preferably carried out while adjusting the pH value of the reaction system at from about 4 to about 7 throughout the time the stabilization reaction is being carried out in the presence of the sodium and/or potassium salt of EDTA such as indicated above. Of course, a deviation from these pH conditions for a short period of time to an extent that does not result in the improvement effects of the present invention being lost in permissible, but it is preferred that the above-indicated range be maintained during the reaction. The adjustment of the pH value can be readily accomplished by the addition to the reaction system of known acidic substances or basic substances. Since the hydrocarbonaceous mixed medium of a sodium and/or potassium salt of EDTA is basic in character, the pH value can be adjusted to from about 4 to about 7 by adding to the reaction system a known acidic substance, e.g., an inorganic acidic substance such as hydrochloric, sulfuric or phosphoric acid, or an organic acidic substance such as acetic, propionic or butyric acid. As the reaction proceeds, formaldehyde or formic acid is formed, with the consequence that the pH value of the reaction system drops below 4 at times. In such a case the pH value of the reaction system can be adjusted to the aforesaid range of from about 4 to about 7 by the further addition thereto of a sodium and/or potassium salt of EDTA or other known basic substances such, for example, as the inorganic base substances as ammonia, sodium hydroxide and potassium hydroxide and the organic basic substances as aniline and ethylenediamine.

When the pH value of the reaction system becomes less than about 4, the main chain of the oxymethylene copolymer is susceptible to breakage which can result in a substantial drop in the molecular weight of the stabilized oxymethylene copolymer. On the other hand, when the pH value of the reaction system exceeds about 7 and becomes substantially alkaline in character, discoloration of the stabilized oxymethylene copolymer takes place, causing a marked decline in its practical utility value.

In this invention, the stabilization reaction is carried out at a temperature ranging between about 100° and about 170° C. When the temperature is too low, the stabilization of the oxymethylene copolymer does not take place sufficiently, whereas when it is too high, substantial breakage of the main chain of the oxymethylene copolymer takes place.

The reaction time is suitably varied in accordance with the amount of the sodium and/or potassium salt of EDTA used, the pH value of the reaction system and the reaction temperature, but usually about one minute to about 60 minutes will suffice.

In this invention, the oxymethylene copolymer is in solution or partly suspended in the aforesaid hydrocarbonaceous mixed medium at the time of the stabilization treatment reaction. When the system cools or is cooled subsequent to the treatment, a stabilized oxymethylene copolymer of sandy form and of good washing efficiency is obtained.

When the system cools or is cooled after completion of the stabilization treatment in this invention, it separates into two phases, a hydrocarbonaceous layer, and an aqueous layer. Since the hydrocarbonaceous layer contains practically no formaldehyde (which may be formed as a result of the decomposition of the unstable terminal portions of the oxymethylene copolymer or the oxymethylene homopolymer) there is the advantage that it can be recycled and be reused without undergoing a special purification step.

According to this invention, excellent effects are demonstrated in removing the unstable terminal portions of the oxymethylene copolymer and the oxymethylene homopolymer contained in the oxymethylene copolymer. Hence, it becomes possible to obtain with good quality reproducibility stabilized oxymethylene copolymers having a base stability of at least 99.0% and an $A_{222}$ of below 0.02% per minute.

The following examples along with control experiments will be given to illustrate more fully serveral modes of practicing the invention method.

In the following:

1. The polymer yield is the percentage by weight of stabilized oxymethylene copolymer recovered on the basis of the oxymethylene copolymer charged.

2. 2. $[\eta]$ is the intrinsic viscosity as measured at 60° C. on a solution of the oxymethylene copolymer in p-chlorophenol containing 2 wt. % of alpha-pinene. 3. The degree of base stability is a value obtained in the following manner. About 10 grams of polymer is weighed out. This polymer is added to a combined solution of 1 milliliter of tri-n-butylamine and 100 milliliters of benzyl alcohol. After heating this mixture for 2 hours at 160° C., it is cooled, and the precipitated polymer is recovered and followed by washing with acetone and drying. The weight of the so obtained polymer relative to that of the polymer before its treatment expressed in percentage is designated the degree of base stability. This degree of base stability becomes the measure of the amount of the unstable portion at the ends of the oxymethylene copolymer and the oxymethylene homopolymer contained in the oxymethylene copolymer. The higher this degree of base stability, the smaller the amount of the aforesaid unstable portion and content of oxymethylene homopolymer. A value of above 99% is desired from the standpoint of the practical usefulness of the resulting oxymethylene copolymer.

4. $A_{222}$ is the reaction rate constant for thermal degradation at 222° C. in atmospheric air of a composition obtained by incorporating in 100 parts by weight of the resulting stabilized oxymethylene copolymer 0.4 part by weight of 2,2'-methylenebis(4-methyl-6-tert. butylphenol) and 0.3 part by weight of polymetaxylylenemalonamide (molecular weight 1200) and is a value calculated as follows:

$$A_{222} = \frac{2.303}{t} \log \frac{W_o}{W} \times 100(\%/\min)$$

wherein $t$ is the measurement time (min.), $W_o$ is the original copolymer weight, and W is the weight of the sample $t$ minutes after the initiation of the measurement.

EXAMPLES 1 – 8 AND CONTROLS 1 – 3

A glass autoclave was charged with 1000 grams of a mixed medium consisting of 100 grams of a copolymer of formaldehyde and 1,3,6-trioxocane (content of 1,3,6-trioxocane units: 6.0 wt. %) having an $[\eta]$ of 1.47, a base stability of 95.5% and an $A_{222}$ of 0.33%/min.; methyl alcohol, toluene and water in the percentages indicated in the hereinafter given Table 1; and 0.2 gram of tetrasodium salt of EDTA. Hydrochloric acid was then added to the reaction system to adjust its pH to 7.0.

The reaction was then carried out by raising the temperature of the reaction system up to 140° C. over a period of 30 minutes and maintaining this temperature for 10 minutes. After completion of the reaction, the pH of the reaction mixture was measured. The results obtained are shown in Table 1.

The polymer was separated from the reaction mixture by filtration, followed by washing with water and then acetone and thereafter dried for 3 hours at 60° C. under reduced pressure to obtain a stabilized oxymethylene copolymer. The polymer yield, $[\eta]$, base stability, $A_{222}$ and color of the so obtained stabilized oxymethylene copolymer are shown in Table 1.

Table 1

| No. | Composition of Mixed Medium (wt.%) | | | pH at Time of Completion of Reaction | Stabilized Oxymethylene Copolymer | | | | | |
|---|---|---|---|---|---|---|---|---|---|---|
| | Methyl alcohol | Toluene | Water | | Copolymer Yield (wt.%) | $[\eta]$ | Base Stability (%) | $A_{222}$ (%/min.) | Form | Color |
| Example 1 | 6 | 92 | 2 | 6 | 95.5 | 1.47 | 99.7 | 0.010 | crude granular | pure white |
| Control 1 | 5 | 90 | 5 | 6.6 | 97.5 | 1.50 | 98.0 | 0.045 | blocky | " |
| Example 2 | 10 | 88 | 2 | 6 | 95.5 | 1.48 | 99.8 | 0.008 | fine granular | " |
| Control 2 | 10 | 89 | 1 | 6.1 | 97.6 | 1.45 | 97.8 | 0.060 | " | " |
| Example 3 | 15.5 | 80 | 4.5 | 6.2 | 95.5 | 1.47 | 99.8 | 0.008 | " | " |
| Example 4 | 45 | 50 | 5 | 6.2 | 95.4 | 1.47 | 99.5 | 0.015 | " | " |
| Example 5 | 10 | 82 | 8 | 6.5 | 95.3 | 1.44 | 99.7 | 0.012 | crude granular | " |
| Example 6 | 20 | 70 | 10 | 6.5 | 95.2 | 1.48 | 99.5 | 0.015 | " | " |
| Example 7 | 37 | 51 | 12 | 6.5 | 97.1 | 1.50 | 99.8 | 0.006 | fine granular | " |
| Example 8 | 20 | 67 | 13 | 6.5 | 95.8 | 1.49 | 99.5 | 0.015 | crude granular | " |
| Control 3 | 15 | 60 | 25 | 6 | 95.7 | 1.49 | 98.6 | 0.035 | blocky | " |

Control 4

Example 1 was repeated but without using the tetrasodium salt of EDTA to obtain a copolymer whose polymer yield was 90.2%, $[\eta]$ was 0.75 and base stability was 95.8%. The $[\eta]$ and base stability of this polymer were too low, and thus this polymer could not be put to practical use.

Control 5

The stabilization of an oxymethylene copolymer was carried out by operating exactly as in Example 1 but changing the amount added of the tetrasodium salt of EDTA to 2.0 grams and without adjusting the pH of the reaction system with hydrochloric acid. The pH of the reaction system, which was 11.0 before the reaction, was 9.0 after completion of the reaction. The polymer yield of the resulting copolymer was 95.8%, while its $[\eta]$ was 1.49, base stability was 98.8%, $A_{222}$ was 0.040%/min. and color was light brown.

As can be seen from the foregoing results, when the reaction is carried out under basic conditions, only copolymers discolored to light shades of brown and of no practical use can be obtained.

EXAMPLE 9

Example 1 was repeated but using ethyl alcohol instead of methyl alcohol to carry out the stabilization of an oxymethylene copolymer. The pH of the mixed medium at the time of the completion of the reaction was 6.0. The polymer yield of the resulting stabilized oxymethylene copolymer was 96.6%, while its $[\eta]$ was 1.50, base stability was 99.8% and $A_{222}$ was 0.010%/min.

EXAMPLE 10

The stabilization of an oxymethylene copolymer was carried out by operating the experiment as in Example 1, except that n-heptane was used instead of toluene. The pH of the mixed medium, after completion of the reaction, was 5.7. The polymer yield of the resulting stabilized oxymethylene copolymer was 96.0%, while its $[\eta]$ was 1.49, base stability was 99.8% and $A_{222}$ was 0.009%/min.

EXAMPLE 11

A slurry consisting of 100 grams of an oxymethylene homopolymer of $[\eta] = 8.0$, 10 grams of 1,3,6-trioxocane and 872 grams of toluene was held at 60° C. 284 Milligrams of boron trifluoride diethyl etherate was then added to the foregoing slurry, and the copolymerization reaction was carried out for 30 minutes with stirring. This was followed by the addition of 550 milligrams of tri-n-butylamine to terminate the reaction.

To the so obtained slurry were then added 114 grams of methyl alcohol, 23 grams of water and 0.23 gram of tetrasodium salt of EDTA, after which this mixture was charged to an autoclave, and the reaction was carried out for 10 minutes at 150° C. with stirring. The water phase, whose pH before the reaction was 7.0, was 5.8 after the reaction.

The polymer was separated from the reaction mixture by filtration, washed with water and then with acetone and thereafter dried for 3 hours at 60° C. under reduced pressure to obtain a stabilized oxymethylene copolymer. The resulting oxymethylene copolymer was of fine sandy form and had an $[\eta]$ of 1.52, base stability of 99.8% and $A_{222}$ of 0.008%/min.

EXAMPLE 12

A 1.5-liter glass autoclave fitted with a stirrer was charged with 100 grams of trioxane, 10 grams of 1,3-dioxolane and 700 grams of cyclohexane, to which was further added 1.0 gram of boron trifluoride diethyl etherate as catalyst. The copolymerization reaction was then carried out by maintaining the reaction system for 1.0 hour at 60° C. with stirring. Next, the copolymerization reaction was terminated by causing the absorption of 20 grams of ammonia gas by the slurry.

118 Grams of ethyl alcohol, 30 grams of water and 0.23 grams of tetrasodium salt of EDTA were added to the foregoing slurry, and the reaction was carried out for 10 minutes at 150° C. with stirring. The water phase, whose pH before the reaction was 6.6, was 5.7 after the reaction.

The polymer was separated from the reaction mixture by filtration, washed with water and then with acetone and thereafter dried for 3 hours at 60° C. under reduced pressure to obtain a stabilized oxymethylene copolymer. The resulting oxymethylene copolymer of fine sandy form had an [η] of 1.60, base stability of 99.6% and $A_{222}$ of 0.009%/min.

We claim:

1. A method of stabilizing oxymethylene copolymers which comprises heating an oxymethylene polymer in a hydrocarbonaceous mixed medium consisting of about 50 – 92% by weight of a hydrocarbon having 5 – 7 carbon atoms, about 6 – 48% by weight of at least one alcohol and about 2 – 20% by weight of water based on the total amount of the medium, at a temperature of from about 100° to about 170° C. in the presence of a salt selected from the group consisting of the sodium and potassium salts of ethylenediaminetetraacetic acid under the conditions of a pH value of from about 4 to about 7, and removing the stabilized oxymethylene copolymers from the reaction mixture.

2. The method of claim 1 wherein said hydrocarbon is a member selected from the group consisting of aliphatic hydrocarbons having 5 – 7 carbon atoms, alicyclic hydrocarbons having 5 – 7 carbon atoms, aromatic hydrocarbons having 6 – 7 carbon atmoms, and mixtures of these hydrocarbons.

3. The method of claim 1 wherein said alcohol is an alcohol having 1 – 3 carbon atoms.

4. The method of claim 2 wherein the hydrocarbon is: n-pentane, n-hexane, n-heptane, cyclopentane, cyclohexane, benzene or toluene.

5. The method of claim 4 wherein the hydrocarbon is n-heptane or toluene.

6. The method of claim 3 wherein the alcohol is aliphatic and monohydric.

7. The method of claim 6 wherein the alcohol is methanol, ethanol, n-propanol, isopropanol, or mixtures thereof.

8. The method of claim 7 wherein the alcohol is methanol or ethanol.

9. The method of claim 4 wherein the alcohol is methanol, ethanol, n-propanol, isopropanol, or mixtures thereof.

10. The method of claim 1 wherein the hydrocarbonaceous mixed medium is used in an amount of from about 400 to about 2,000 parts by weight per 100 parts by weight of the oxymethylene copolymer.

11. The method of claim 9 wherein the amount of the salt of ethylenediaminetetraacetic acid is from about 0.1 to about 3 parts by weight per 100 parts by weight of the oxymethylene copolymer.

12. The method of claim 11 wherein the salt of the ethylenediaminetetraacetic acid is tetrasodium.

13. The method of claim 11 wherein the pH of the reaction system is adjusted to from about 4 to about 7 throughout the reaction, by the addition of organic or inorganic acids or bases.

14. The method of claim 11 wherein the total reaction time is from about 1 to 60 minutes.

15. The method of claim 14 wherein the total reaction time is from about 10 to 40 minutes.

16. The method of claim 11 wherein the reaction mixture residue is cooled so as to form a substantially formaldehyde-free hydrocarbonaceous layer and an aqueous layer, the aqueous layer is discarded, and the hydrocarbonaceous layer is recycled into further oxymethylene copolymer stabilization reactions.

* * * * *

UNITED STATES PATENT OFFICE
CERTIFICATE OF CORRECTION

Patent No. 4,035,338          Dated July 12, 1977

Inventor(s) ISHII, ET AL.

It is certified that error appears in the above-identified patent and that said Letters Patent are hereby corrected as shown below:

Claim 1, line 2, delete "polymer", insert -- copolymer --.

*Signed and Sealed this*

*Fourth* Day of *October 1977*

[SEAL]

Attest:

RUTH C. MASON         LUTRELLE F. PARKER
*Attesting Officer*      *Acting Commissioner of Patents and Trademarks*